(12) United States Patent
Imai et al.

(10) Patent No.: US 12,607,888 B2
(45) Date of Patent: Apr. 21, 2026

(54) ILLUMINATION CONTROL DEVICE

(71) Applicant: Japan Display Inc., Tokyo (JP)

(72) Inventors: Takayuki Imai, Tokyo (JP); Kazunori Yamaguchi, Tokyo (JP); Hiroyuki Wakana, Tokyo (JP)

(73) Assignee: Japan Display Inc., Tokyo (JP)

( * ) Notice: Subject to any disclaimer, the term of this patent is extended or adjusted under 35 U.S.C. 154(b) by 40 days.

(21) Appl. No.: 18/735,905

(22) Filed: Jun. 6, 2024

(65) Prior Publication Data

US 2024/0319527 A1     Sep. 26, 2024

Related U.S. Application Data

(63) Continuation of application No. PCT/JP2022/037792, filed on Oct. 11, 2022.

(30) Foreign Application Priority Data

Dec. 10, 2021     (JP) ................................. 2021-200702

(51) Int. Cl.
G02F 1/133      (2006.01)
G02F 1/1335     (2006.01)
H05B 47/175     (2020.01)
H05B 47/19      (2020.01)

(52) U.S. Cl.
CPC .... G02F 1/13306 (2013.01); G02F 1/133531 (2021.01); H05B 47/19 (2020.01); H05B 47/1965 (2024.01)

(58) Field of Classification Search
None
See application file for complete search history.

(56) References Cited

U.S. PATENT DOCUMENTS

| | | | | |
|---|---|---|---|---|
| 11,153,944 B2 * | 10/2021 | Wen | ........................ | H05B 45/10 |
| 2003/0060162 A1 * | 3/2003 | Shinagawa | ............. | G06F 1/163 |
| | | | | 455/100 |
| 2014/0132827 A1 * | 5/2014 | Imai | ..................... | H05B 47/125 |
| | | | | 348/370 |
| 2021/0385919 A1 * | 12/2021 | Liao | ........................ | H05B 45/12 |

(Continued)

FOREIGN PATENT DOCUMENTS

| | | |
|---|---|---|
| JP | H02-065001 A | 3/1990 |
| JP | 2016-189344 A | 11/2016 |
| JP | 2019-175639 A | 10/2019 |

OTHER PUBLICATIONS

Search Report issued in related International Patent Application No. PCT/JP2022/037792 on Dec. 6, 2022 and English translation of same. 6 pages.

(Continued)

*Primary Examiner* — Ryan Crockett
(74) *Attorney, Agent, or Firm* — K&L Gates LLP

(57)     ABSTRACT

An illumination control device includes a storage that is non-transitory and stores setting information for controlling a light emitter configured to emit light, and a controller that writes the setting information as of then to the storage when a request for writing the setting information is input and reads the setting information from the storage when a request for reading the setting information is input. The light emitter is controlled based on the setting information read by the controller.

8 Claims, 18 Drawing Sheets

(56) References Cited

U.S. PATENT DOCUMENTS

2024/0381509 A1* 11/2024 Yamaguchi ........... G02F 1/1347

OTHER PUBLICATIONS

Written Opinion issued in related International Patent Application No. PCT/JP2022/037792 on Dec. 6, 2022. 4 pages.
Office Action issued in related Japanese Patent Application No. 2023-566109, mailed on Jul. 30, 2024 and English translation of same. 7 pages.

* cited by examiner

Figure 2:
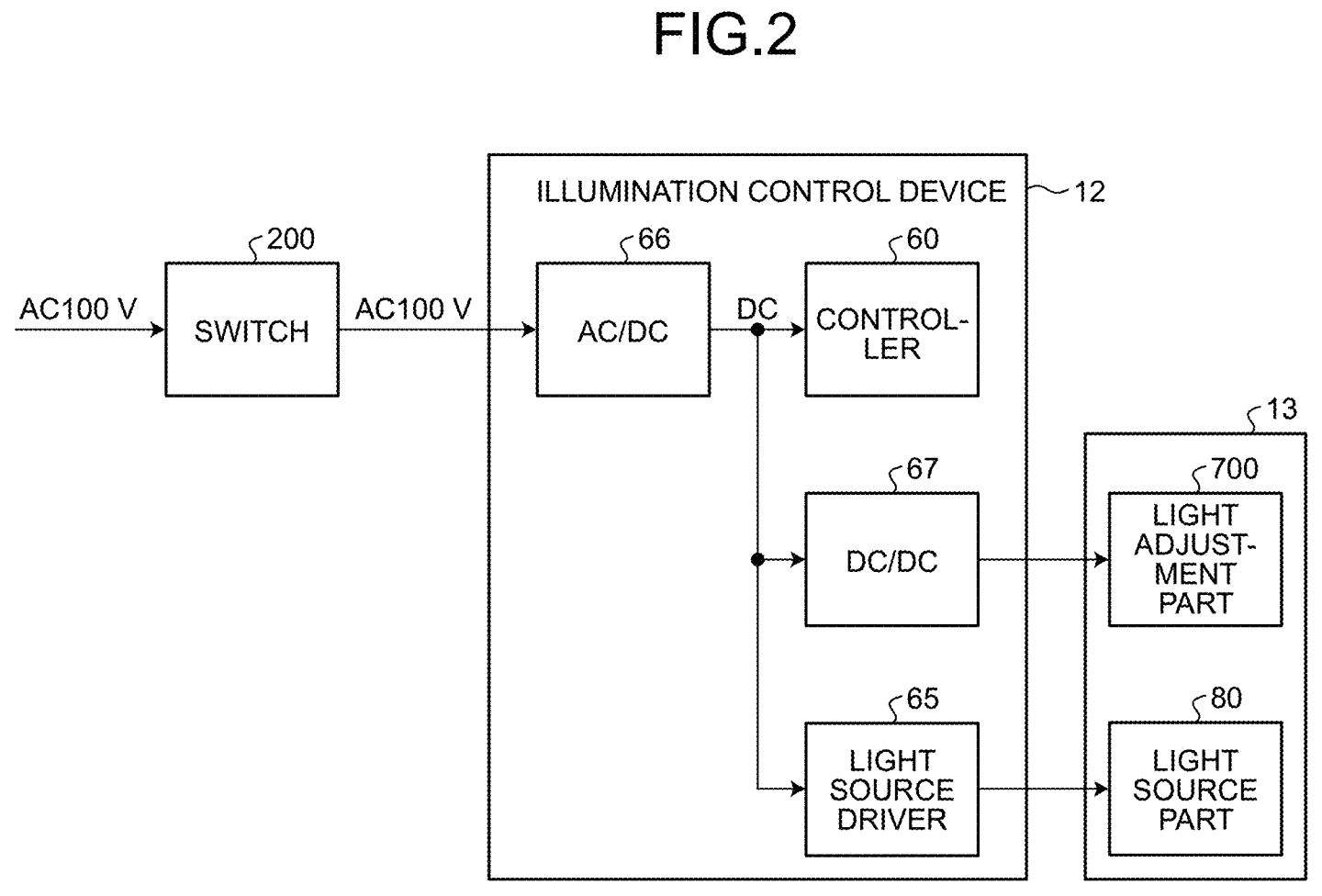

200
SWITCH

AC100 V

ILLUMINATION CONTROL DEVICE — 12

66
AC/DC

DC

60
CONTROL-LER

67
DC/DC

65
LIGHT SOURCE DRIVER

13

700
LIGHT ADJUST-MENT PART

80
LIGHT SOURCE PART

1

30    24    33                                    22  201

IV                                                              IV          40

25                                                                          202
                                                                            203
                                                                            204
                                                                            205
                                                                            206
                                                                            207
                                                                            208

209

210

211

3                                                                           213
21                                                                          212
40                                                            2a            41
                                                                            41

2

101 102 103 104 105 106 107 108 109 110 111  113 112

ILLUMINATION CONTROL DEVICE

CROSS-REFERENCE TO RELATED APPLICATION

This application is a continuation of International Patent Application No. PCT/JP2022/037792 filed on Oct. 11, 2022 which designates the United States, incorporated herein by reference, and which claims the benefit of priority from Japanese Patent Application No. 2021-200702 filed on Dec. 10, 2021, incorporated herein by reference.

BACKGROUND

1. Technical Field

The present disclosure relates to an illumination control device.

2. Description of the Related Art

An illumination instrument including a liquid crystal light adjustment element is disclosed in Japanese Patent Application Laid-open Publication No. H02-65001 (JP-A-H02-65001). In the illumination instrument disclosed in JP-A-H02-65001, light adjustment is performed by providing an electric signal to the liquid crystal light adjustment element.

In the illumination instrument disclosed in JP-A-H02-65001, light adjustment can be performed by changing a setting value of the electric signal provided to the liquid crystal light adjustment element. However, the electric signal needs to be set each time power is input to the illumination instrument to achieve the same use state as a previously set light adjustment state, in other words, a previous use state when power is turned on.

The present invention is made in view of the above-described problem and intended to provide an illumination control device capable of achieving the same use state as a previous use state in an illumination device when power is turned on.

SUMMARY

An illumination control device according to an embodiment of the present disclosure includes a storage that is non-transitory and stores setting information for controlling a light emitter configured to emit light, and a controller that writes the setting information as of then to the storage when a request for writing the setting information is input and reads the setting information from the storage when a request for reading the setting information is input. The light emitter is controlled based on the setting information read by the controller.

BRIEF DESCRIPTION OF THE DRAWINGS

FIG. 2 is a diagram illustrating a power system of the illumination control device in FIG. 1;

DETAILED DESCRIPTION

Aspects (embodiments) of the present invention will be described below in detail with reference to the accompanying drawings. Contents described below in the embodiments do not limit the present invention. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the invention is contained in the scope of the present invention. For clearer description, the drawings are schematically illustrated for the width, thickness, shape, and the like of each component as compared to an actual aspect in some cases, but the drawings are merely exemplary and do not limit interpretation of the present invention. In the present specification and drawings, any element same as that already described with reference to an already described drawing is denoted by the same reference sign, and detailed description thereof is omitted as appropriate in some cases.

Illumination Control Device and Illumination Device

Figure 1:
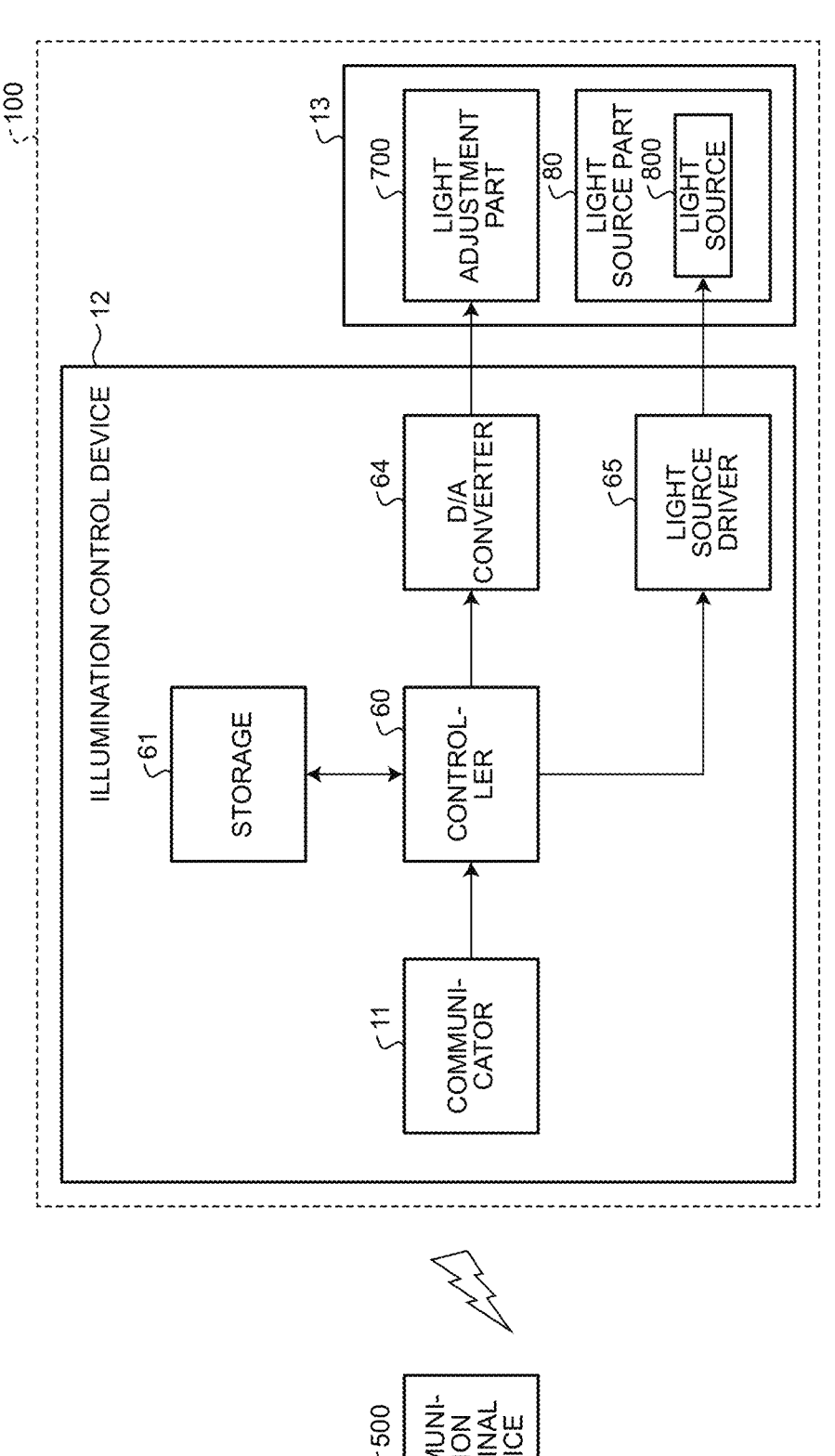
FIG. 1 is a diagram illustrating an exemplary configuration of an illumination device including an illumination control device according to the present embodiment.

FIG. 1 is a diagram illustrating an exemplary configuration of an illumination device 100 including an illumination control device according to the present embodiment. In FIG. 1, the illumination device 100 includes an illumination control device 12 and a light emitter 13.

The light emitter 13 includes a light source part 80 and a light adjustment part 700. The light source part 80 includes a light source 800. The light source 800 is, for example, a light emitting diode (LED). The light adjustment part 700 can change the shape and size of light. Light from the light source 800 is incident on the light adjustment part 700. The light adjustment part 700 adjusts the light incident from the light source 800. The light adjustment performed by the light adjustment part 700 changes the shape and size of the incident light. The light adjusted by the light adjustment part 700 is emitted from the light adjustment part 700. A more detailed configuration of the light emitter 13 will be described later.

The illumination control device 12 includes a communicator 11, a controller 60, a storage 61, a D/A converter 64, and a light source driver 65.

The communicator 11 performs wireless communication with a communication terminal device 500 in the present example. The communicator 11 acquires setting information from the communication terminal device 500. The setting information acquired by the communicator 11 is transferred to the controller 60. The setting information is information for controlling the light emitter 13. In the present example, the setting information includes luminance data for controlling the luminance of the light source 800 and control data for controlling the light adjustment part 700. Note that, in a case where the luminance of the light source 800 is fixed, the setting information does not include the luminance data but includes the control data for controlling the light adjustment part 700.

The luminance of the light source 800 may be changed by, for example, pulse width modulation (PWM) control that changes an applied pulse width. In this case, the luminance data for controlling the luminance of the light source 800 is data of the pulse duty ratio.

The control data for controlling the light adjustment part 700 is, for example, data of a diffusion degree of light diffusion. The diffusion degree data is, for example, data of a diffusion degree in an X direction and a diffusion degree in a Y direction. Circular light of an intermediate diffusion degree is obtained when the diffusion degree in the X direction is 50% and the diffusion degree in the Y direction is 50%. Vertically long elliptical light is obtained when the diffusion degree in the X direction is 0% and the diffusion degree in the Y direction is 50%. Horizontally long elliptical light is obtained when the diffusion degree in the X direction is 50% and the diffusion degree in the Y direction is 0%.

The controller 60 controls each component of the illumination control device 12. When a request for writing the setting information of the own device, in other words, the illumination control device 12 is input, the controller 60 writes the setting information as of then to the storage 61. In the present example, the controller 60 writes the setting information as of then to the storage 61 when power is turned off. "When a request for writing the setting information is input" is "when a switch operation to power off the own device is performed" or "when a power-off signal is input to the own device". Moreover, when a request for reading the setting information is input, the controller 60 reads the setting information from the storage 61. "When a request for reading the setting information is input" is, for example, "when a switch operation to power on the own device is performed" or "when a signal for powering on the own device is input".

The storage 61 stores the setting information. The storage 61 also stores various kinds of information. The storage 61 is a non-transitory storage that holds storage contents even when power to the illumination device 100 is cut. The storage 61 is constituted by, for example, a non-transitory memory. The non-transitory memory is, for example, an electrically erasable programmable read-only memory (EE-PROM).

The D/A converter 64 outputs an analog signal corresponding to digital data output from the controller 60. The light source driver 65 outputs, based on the digital data output from the controller 60, a signal that drives the light source 800.

The communication terminal device 500 has a function to perform wireless communication with the communicator 11. The communication terminal device 500 can input the setting information upon an operation by a user. The communication terminal device 500 is, for example, a smartphone. In a case where the communication terminal device 500 is a smartphone, an application program for performing wireless communication with the illumination device 100 is installed on the communication terminal device 500.

FIG. 2 is a diagram illustrating a power system of the illumination control device 12 in FIG. 1. The illumination control device 12 operates with, for example, a commercial power source.

The illumination control device 12 includes an AC/DC converter 66 configured to convert alternating-current voltage into direct-current voltage, and a DC/DC converter 67 configured to convert the level of the direct-current voltage. The direct-current voltage (DC) as an output from the AC/DC converter 66 is input to the controller 60, the DC/DC converter 67, and the light source driver 65.

When a switch 200 is operated on, power is input to the illumination control device 12. Accordingly, alternating-current voltage is input to the illumination control device 12. The illumination control device 12 operates upon the inputting of the alternating-current voltage. The alternating-current voltage is, for example, 100 V. When the switch 200 is operated off, power input to the illumination control device 12 is cut. Accordingly, the operation of the illumination control device 12 stops. Note that, the AC/DC converter 66 includes a non-illustrated capacitor, and thus time of several seconds approximately is needed until power supply actually stops after the switch 200 is operated off.

Exemplary Operation

Figure 3:
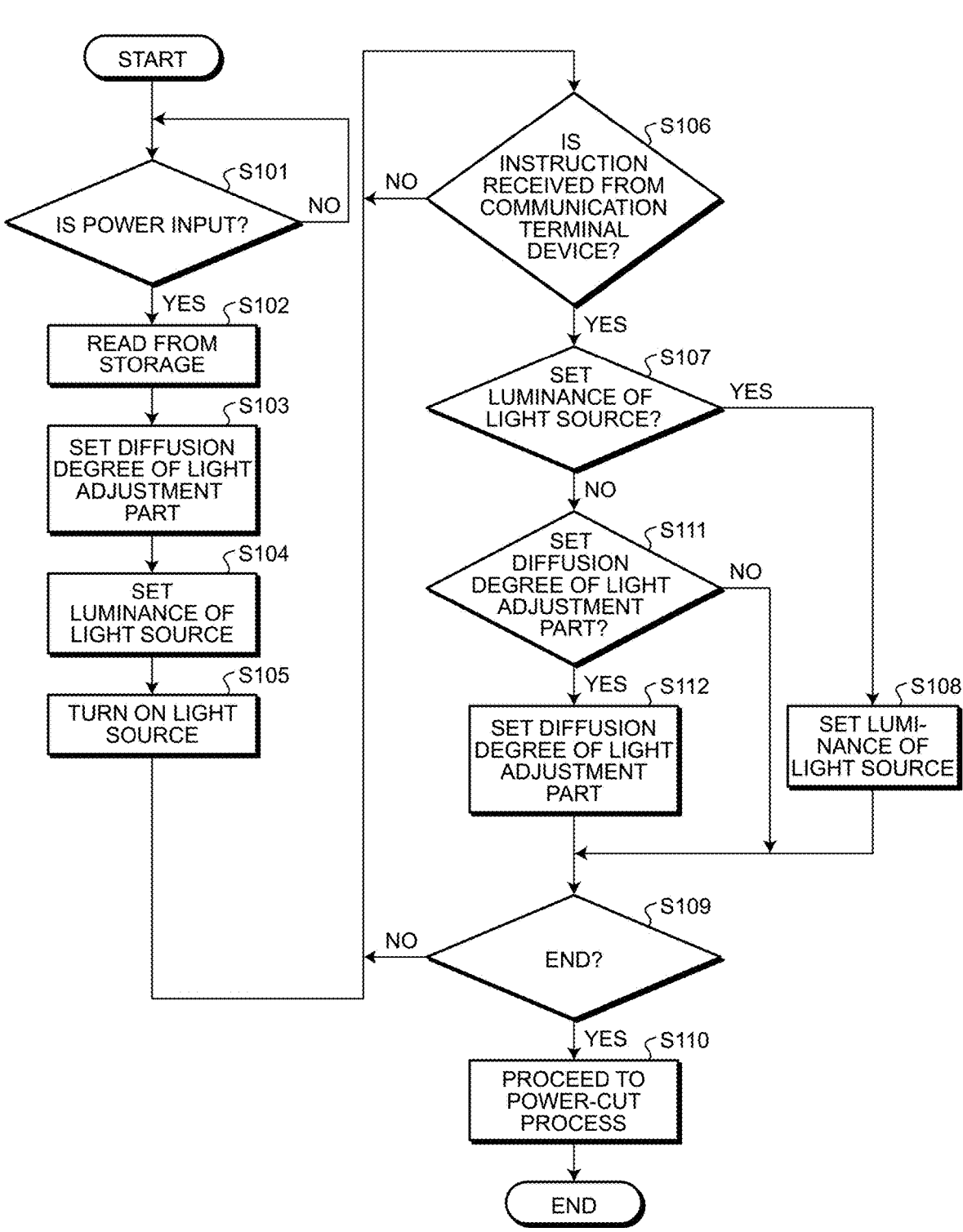
FIG. 3 is a flowchart illustrating a processing example when the power is input to the illumination control device.
Figure 4:
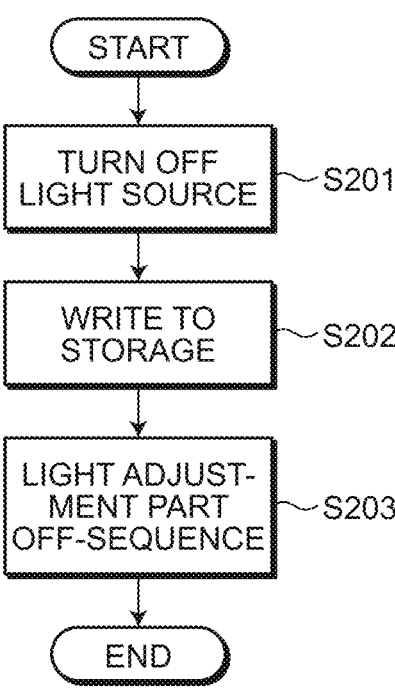
FIG. 4 is a flowchart illustrating a power-cut process example when power input to the illumination control device is cut.

FIGS. 3 and 4 are flowcharts illustrating examples of processing by the controller 60 in FIG. 1. FIG. 3 is a flowchart illustrating a processing example when power is input to the illumination control device 12. FIG. 4 is a flowchart illustrating an example of a power-cut process when power input to the illumination control device 12 is cut.

In FIG. 3, first, the controller 60 determines whether power is input to the illumination control device 12 (step S101). Processing by the controller 60 waits until power is input (No at step S101).

When having determined that power is input to the illumination control device 12, in other words, when having determined that a request for reading the setting information is input (Yes at step S101), the controller 60 reads the setting information, in other words, the control data and the luminance data from the storage 61 (step S102).

Subsequently, the controller 60 sets the diffusion degree of the light adjustment part 700 based on the control data (step S103). In addition, the controller 60 sets the luminance of the light source 800 based on the luminance data (step S104). Thereafter, the controller 60 turns on the light source 800 (step S105). Accordingly, after the light adjustment part 700 is controlled based on the control data, the luminance of the light source 800 is controlled based on the luminance data. Since the luminance of the light source 800 is controlled after the light adjustment part 700 is controlled, light halfway through control by the light adjustment part 700 is not emitted and thus no discomfort is provided to the user.

The controller 60 determines whether an instruction related to the setting information is received from the communication terminal device 500 (step S106). When having determined that no instruction is received at step S106, the controller 60 maintains the current state of the light emitter 13 (No at step S106).

When having determined that the instruction is received at step S106 (Yes at step S106), the controller 60 determines whether the instruction is related to setting of the luminance of the light source 800 (step S107). When having determined that the instruction is related to setting of the luminance of the light source 800 at step S107 (Yes at step S107), the controller 60 sets the luminance of the light source 800 in accordance with the contents of the instruction (step S108).

Thereafter, the controller 60 determines whether to end processing (step S109). When having determined to end processing at step S109 (Yes at step S109), for example, when an operation to turn off the switch 200 is performed or when a power-off signal is received, the controller 60 determines that a request for writing the setting information is input, and proceeds to the power-cut process illustrated in FIG. 4 (step S110).

When having determined that the instruction is not related to setting of the luminance of the light source 800 at step S107 (No at step S107), the controller 60 determines whether the instruction is related to setting of the diffusion degree of the light adjustment part 700 (step S111). When having determined that the instruction is related to setting of the diffusion degree of the light adjustment part 700 at step S111 (Yes at step S111), the controller 60 sets the diffusion degree of the light adjustment part 700 in accordance with the contents of the instruction (step S112). Thereafter, the controller 60 proceeds to step S109. When having determined that the instruction is not related to setting of the diffusion degree of the light adjustment part 700 at step S111, the controller 60 proceeds to step S109 (No at step S111).

The controller 60 determines whether to end processing (step S109). When having determined to end processing at step S109 (Yes at step S109), the controller 60 proceeds to the power-cut process illustrated in FIG. 4 (step S110).

When having determined not to end processing at step S109 (No at step S109), the controller 60 returns to step S106 and continues processing.

In FIG. 4, first, the light source 800 is turned off (step S201). Subsequently, the setting information, in other words, the control data and the luminance data are written to storage 61 (step S202). The setting information written to the storage 61 is read next time power is input, and then the setting information is used for setting of the diffusion degree of the light adjustment part 700 and setting of the luminance of the light source 800 (refer to steps S103 and S104 in FIG. 3).

Lastly, off-sequence of the light adjustment part 700 is executed (step S203). The off-sequence of the light adjustment part 700 is processing of discharging applied voltage. This processing is, for example, processing of discharging electric charge provided to the light adjustment part 700 or processing of applying voltage of zero volt from the D/A converter 64.

When power is turned off, the setting information is written to the storage 61 by the processing described above with reference to FIG. 4. Then, when power is turned on, the setting information is read from the storage 61 and the light emitter 13 is controlled based on the read setting information by the processing described above with reference to FIG. 3. Through such processing, the same light as at power-off can be emitted. In other words, the same use state as a previous use state can be achieved when power is turned on. Thus, the user does not need to perform setting of the diffusion degree of the light adjustment part 700 and setting of the luminance of the light source 800 each time power is input. Note that "at power-off" is a time until power is actually cut since the switch 200 (refer to FIG. 2) is operated off or a time until power is actually cut since a power-off signal is input.

First Modification

In the above-described processing example, the controller 60 writes the setting information to the storage 61 when a switch operation to power off is performed or when a signal for powering off the own device is input. As another processing example, the controller 60 may write the setting information as of then to the storage 61 each time the setting information is changed. In a case where the setting information as of then is written to the storage 61 each time setting is changed, inputting of a command to change the setting information corresponds to inputting of a writing request. The controller 60 writes, to the storage 61, the setting information at a time point when the command to change the setting information is input. An example of processing by the controller 60 in this case will be described below with reference to FIG. 5.

Figure 5:
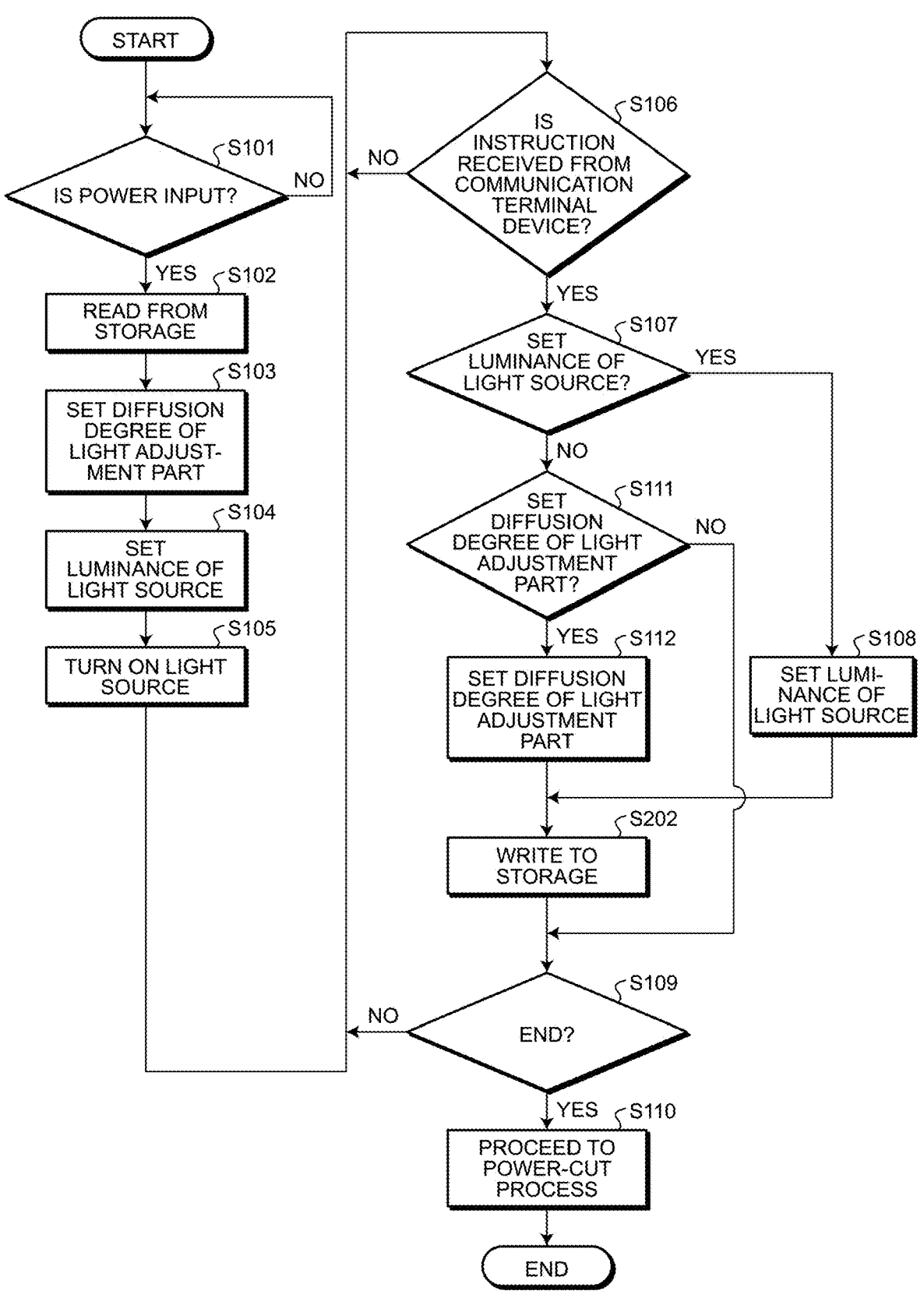
FIG. 5 is a flowchart illustrating another processing example when power is input to the illumination control device.

FIG. 5 is a flowchart illustrating another processing example when power is input to the illumination control device 12. In FIG. 5, processing at steps S101 to S108 is the same as the corresponding processing described above with reference to FIG. 3.

After having set the luminance of the light source 800 (step S108), the controller 60 writes the setting information, in other words, the luminance data of the light source 800 to the storage 61 (step S202). Accordingly, the controller 60 writes, to the storage 61, the luminance data at a time point when the command to change the setting information is input. The setting information written to the storage 61 is read next time power is input, and then the setting information is used for setting of the luminance of the light source 800 (refer to step S104 in FIG. 3). Thereafter, the controller 60 determines whether to end processing (step S109).

After having set the diffusion degree of the light adjustment part 700 (Yes at steps S111, step S112), the controller 60 writes the setting information, in other words, the control data of the light adjustment part 700 to the storage 61 (step S202). Accordingly, the controller 60 writes, to the storage 61, the control data at a time point when the command to change the setting information is input. The setting information written to the storage 61 is read next time power is input, and then the setting information is used for setting of the diffusion degree of the light adjustment part 700 (refer to step S103 in FIG. 3).

In FIG. 5, processing at step S109 is the same as the corresponding processing described above with reference to FIG. 3. When having determined to end processing at step S109 (Yes at step S109), the controller 60 proceeds to a power-cut process illustrated in FIG. 6 (step S110).

Figure 6:
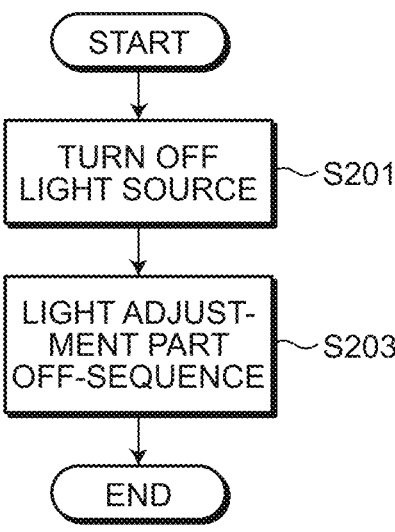
FIG. 6 is a flowchart illustrating another power-cut process example when power input to the illumination control device is cut.

FIG. 6 is a flowchart illustrating another power-cut process example when power input to the illumination control device 12 is cut. In FIG. 6, first, the light source 800 is turned off (step S201). Subsequently, the off-sequence of the light adjustment part 700 is executed (step S203).

Since the setting information is stored in the storage by the processing described above with reference to FIG. 5 each time setting is changed, the latest setting information can be stored even when power input is cut by, for example, electric outage. Thus, the setting information can be read from the storage 61 next time power is turned on, and the light emitter 13 can be controlled based on the read setting information. Through such processing, the same light as at power-off can be emitted. In other words, the same use state as a previous use state can be achieved.

Second Modification

In the processing described above with reference to FIGS. 3 and 5, the luminance of the light source 800 is set and the light source 800 is turned on after the diffusion degree of the light adjustment part 700 is set (refer to steps S104 and S105).

The order of processing may be changed such that the diffusion degree of the light adjustment part 700 is set after the luminance of the light source 800 is set and the light source 800 is turned on. Processing by the controller 60 in this case will be described below with reference to FIG. 7.

Figure 7:
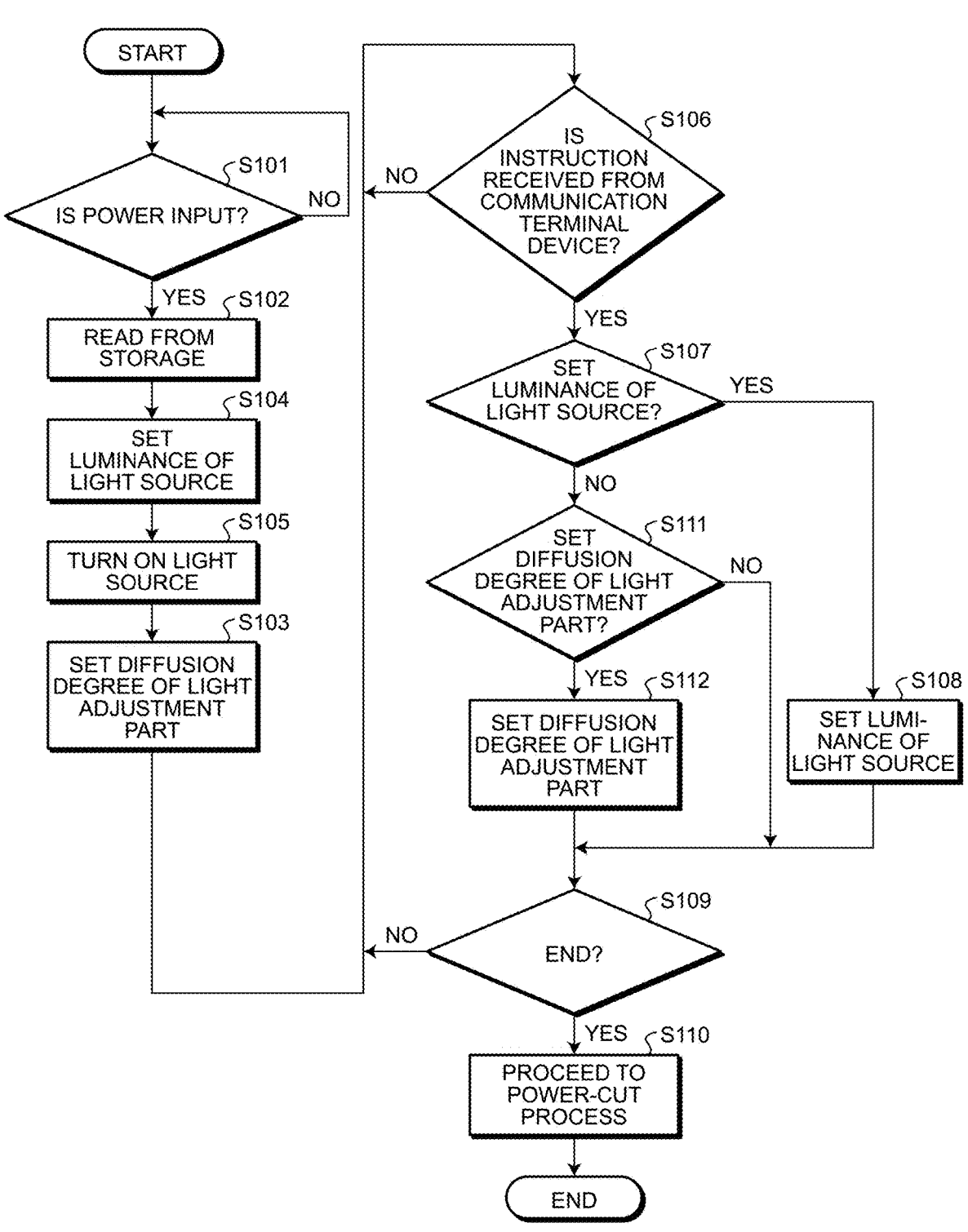
FIG. 7 is a flowchart illustrating another processing example when power is input to the illumination control device.

FIG. 7 is a flowchart illustrating another processing example when power is input to the illumination control device 12. In FIG. 7, processing at steps S101 to S102 is the same as the corresponding processing described above with reference to FIG. 3.

Subsequently, the controller 60 sets the luminance of the light source 800 (step S104) and turns on the light source 800 (step S105), and then sets the diffusion degree of the light adjustment part 700 (step S103). Processing thereafter is the same as the corresponding processing described above with reference to FIG. 3 (steps S106 to S112). Note that the controller 60 performs the processing described above with reference to FIG. 4 when having proceeded to the power-cut process (step S110).

In this manner, through the processing at steps S104, S105, and S103, the light adjustment part 700 is controlled based on the control data after the luminance of the light source 800 is controlled based on the luminance data. The user can view changing of emitted light through operation of the light adjustment part 700 after the light source 800 is turned on first. Accordingly, the user can enjoy the light change as an experience, and accordingly, the entertainment value can be enhanced.

Third Modification

In the second modification, similarly to the case of the first modification, the controller 60 may write the setting information as of then to the storage 61 each time the setting information is changed. An example of processing by the controller 60 in this case will be described below with reference to FIG. 8.

Figure 8:
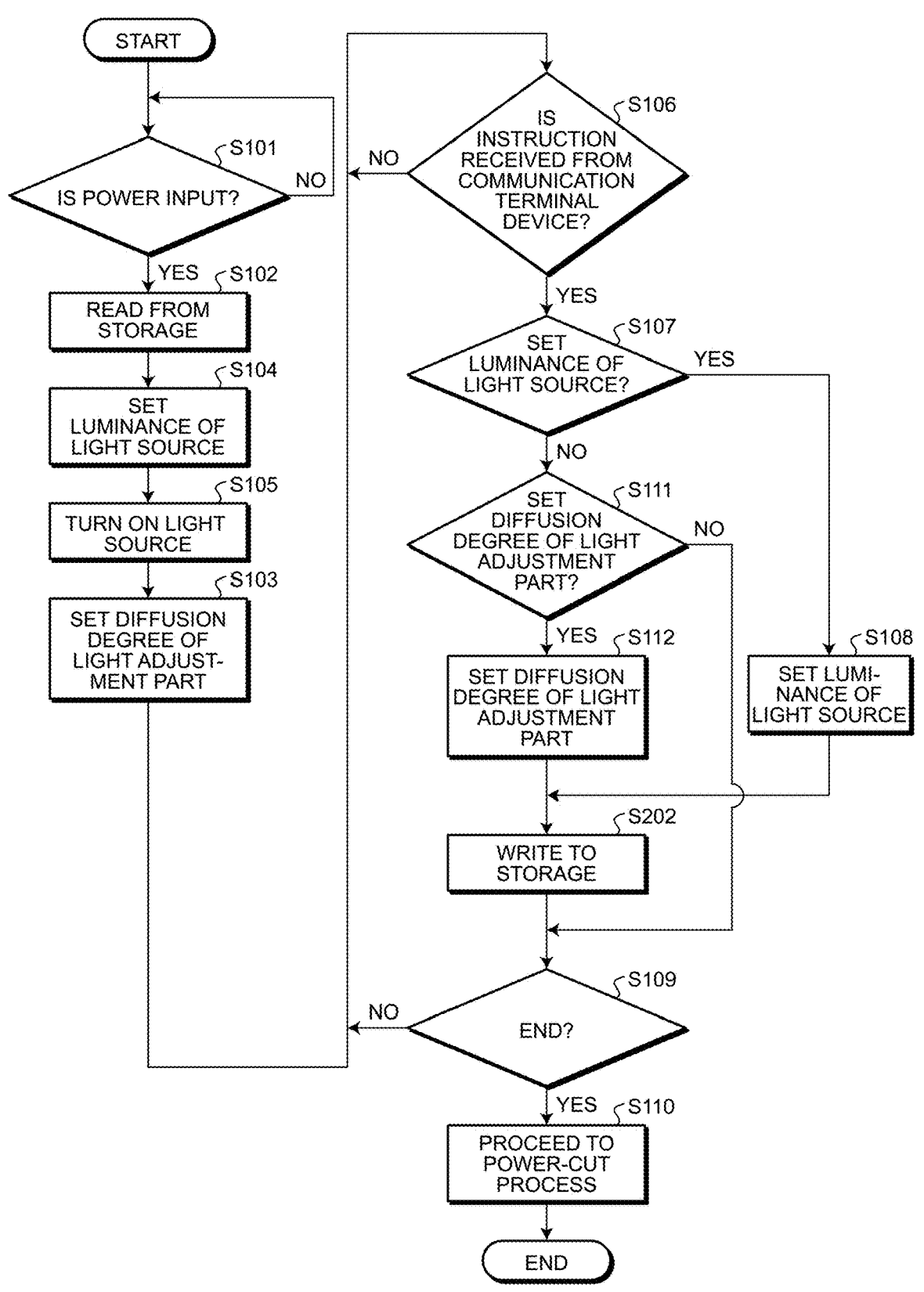
FIG. 8 is a flowchart illustrating another processing example when power is input to the illumination control device.

FIG. 8 is a flowchart illustrating another processing example when power is input to the illumination control device 12. In FIG. 8, processing at steps S101 to S108 is the same as the corresponding processing described above with reference to FIG. 7. In addition, processing at steps S111 to S110 after step S108 is the same as the corresponding processing described above with reference to FIG. 5.

Note that the controller 60 performs the processing described above with reference to FIG. 6 when having proceeded to the power-cut process (step S110).

Similarly to the case of the first modification described above with reference to FIG. 5, since the setting information as of then is stored in the storage each time setting is changed, the latest setting information can be stored even when power input is cut by, for example, electric outage. Thus, the setting information can be read from the storage 61 next time power is turned on, and the light emitter 13 can be controlled based on the read setting information. Through such processing, the same light as at power-off can be emitted. In other words, the same use state as a previous use state can be achieved.

Moreover, similarly to the case of the second modification described above with reference to FIG. 7, the user can view changing of emitted light through operation of the light adjustment part 700 after the light source 800 is turned on first. Accordingly, the user can enjoy the light change as an experience, and accordingly, the entertainment value can be enhanced.

Fourth Modification

At writing to and reading from the storage 61, error occurs to the setting information in some cases. The same use state as a previous use state cannot be achieved when error occurs to the setting information. Thus, data of the setting information may be provided with a parity bit or checksum to verify error existence. In a case where error occurs to the setting information, the error is corrected before the next processing. The storage 61 may store the setting information of a plurality of generations, and the setting information of the past generation may be used when error occurs to the setting information.

Exemplary Configuration of Light Emitter

Figure 9:
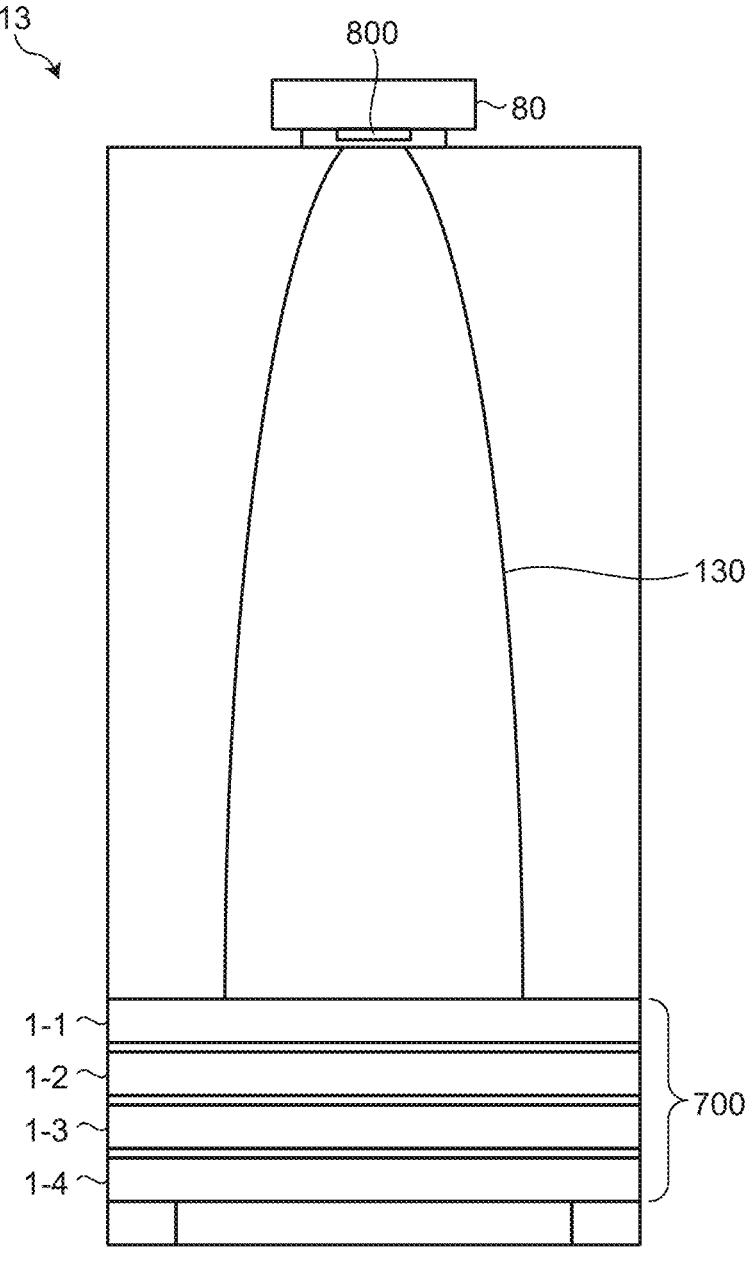
FIG. 9 is a diagram illustrating an exemplary configuration of a light emitter of the illumination device.

FIG. 9 is a diagram illustrating an exemplary configuration of the light emitter 13 of the illumination device 100. FIG. 9 is a diagram illustrating a section along a plane through the central axis of light emitted by the light emitter 13. As illustrated in FIG. 9, the light emitter 13 includes the light source part 80, a reflection plate 130, and the light adjustment part 700. FIG. 9 illustrates a case where the light emitter 13 is a downlight. The light emitter 13 may be an illumination instrument suspended from a ceiling or may be an illumination instrument provided on a wall and used as indirect lighting.

The light source part 80 includes the light source 800. The light source 800 is, for example, an LED mounted on a substrate of the light source part 80.

The reflection plate 130 has a curved surface that reflects light output from the light source 800. The light reflected by the reflection plate 130 is incident on the light adjustment part 700. The light adjustment part 700 emits light from a surface opposite a surface on which the light is incident. The light is emitted to, for example, a floor surface. The light adjustment part 700 includes four light adjustment panels 1-1 and 1-4. The four light adjustment panels 1-1 and 1-4 have the same configuration. The four light adjustment panels 1-1 and 1-4 can change the shape and size of light incident thereon. The light adjustment panels 1-1 and 1-4 deform light from the light source 800, for example, into an elliptical shape.

In the present example, the light adjustment panel 1-1 and the light adjustment panel 1-2 are stacked. The light adjustment panel 1-1 is a light adjustment panel for p-wave polarization. The light adjustment panel 1-2 is a light adjustment panel for s-wave polarization. Flexible light adjustment control is possible by providing signals based on light to be emitted to the light adjustment panel 1-1 and the light adjustment panel 1-2. Note that the light adjustment panel 1-1 may be a light adjustment panel for s-wave polarization and the light adjustment panel 1-2 may be a light adjustment panel for p-wave polarization. It is only required that any one of the light adjustment panel 1-1 and the light adjustment panel 1-2 is a light adjustment panel for p-wave polarization and the other is a light adjustment panel for s-wave polarization.

In the present example, the light adjustment panel 1-3 and the light adjustment panel 1-4 are stacked. The light adjustment panel 1-3 is a light adjustment panel for p-wave polarization. The light adjustment panel 1-4 is a light adjustment panel for s-wave polarization. Flexible light adjustment control is possible by providing signals based on light to be emitted to the light adjustment panel 1-3 and the light adjustment panel 1-3. Note that the light adjustment panel 1-3 may be a light adjustment panel for s-wave polarization and the light adjustment panel 1-4 may be a light adjustment panel for p-wave polarization. It is only required that any one of the light adjustment panel 1-3 and the light adjustment panel 1-4 is a light adjustment panel for p-wave polarization and the other is a light adjustment panel for s-wave polarization.

Accordingly, the four light adjustment panels 1-1 and 1-4 are constituted by two liquid crystal cells for p-wave polarization and two liquid crystal cells for s-wave polarization. With this configuration, it is possible to change the size and shape of light to be emitted, thereby achieving flexible light adjustment control.

Figure 10:
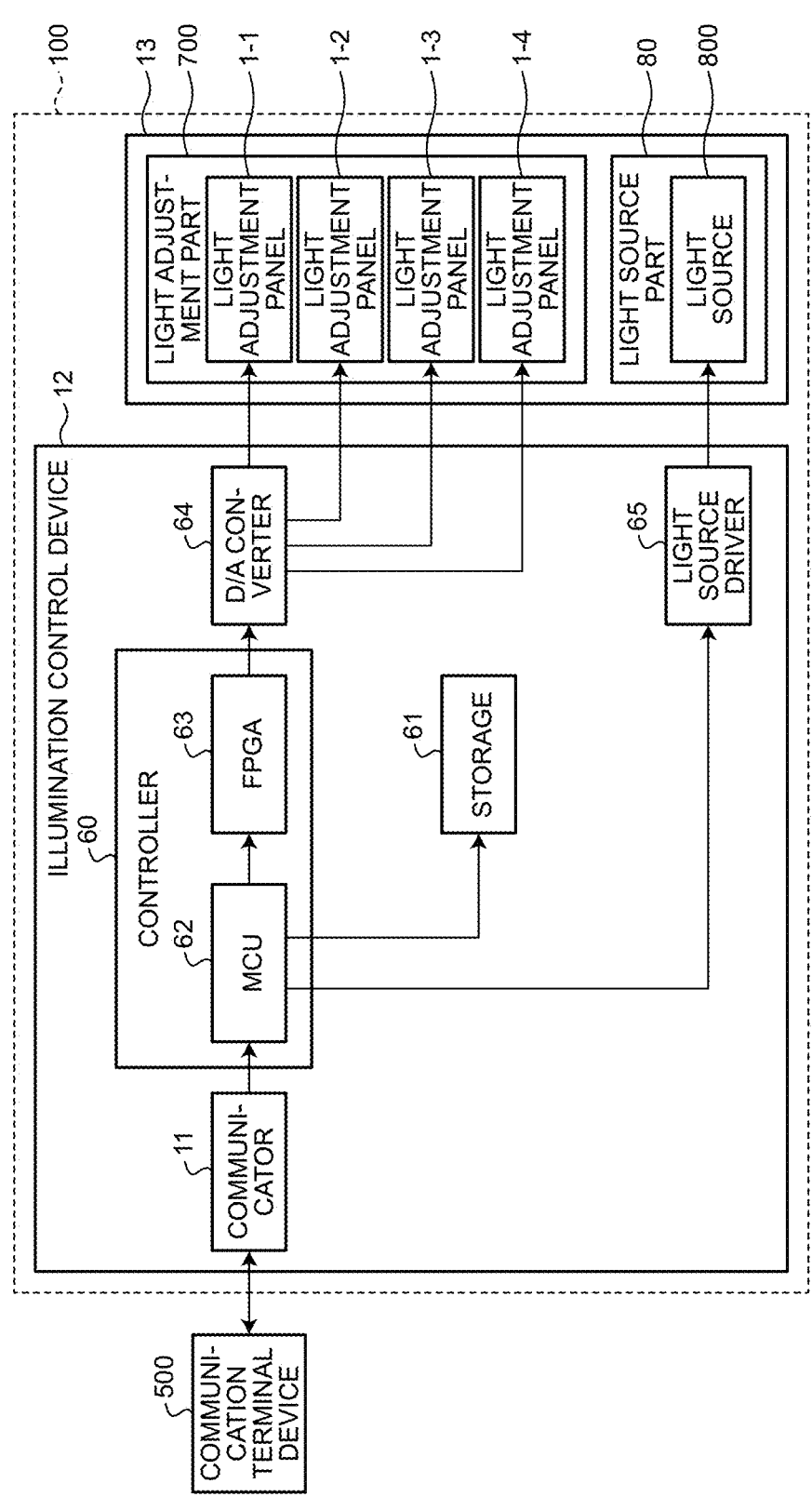
FIG. 10 is a block diagram illustrating a main configuration of a controller and the relation among components included in the controller, a light source unit, and a sensor unit.

FIG. 10 is a block diagram illustrating an exemplary configuration of the illumination control device 12. The illumination control device 12 includes a micro controller unit (MCU) 62, a field programmable gate array (FPGA) 63, a digital/analog (D/A) converter 64, and the light source driver 65. The illumination control device 12 is coupled to the communicator 11.

The communicator 11 performs communication with the communication terminal device 500. Specifically, the communicator 11 includes, for example, a circuit that functions as a network interface controller (NIC). The communicator 11 receives a signal transmitted from the communication terminal device 500 and including a command related to operation of the illumination device 100 and outputs information indicating the command to the MCU 62.

The command related to operation of the illumination device 100 and transmitted from the communication terminal device 500 is a command that designates on/off of light emission by the illumination device 100, the shape, size, and intensity of light, or the like, but is not limited thereto and may include any matter that can be individually designated in an operation control range of the illumination device 100.

The MCU 62 outputs various signals to the FPGA 63 and the light source driver 65 in accordance with the command related to operation of the illumination device 100 and obtained from the communication terminal device 500 through a communicator 1112. In other words, the MCU 62 controls each component of the illumination control device 12 so that the illumination device 100 operates in accordance with operation from the communication terminal device 500.

Under control by the MCU 62, the FPGA 63 performs information processing for controlling operation of the light adjustment part 700 and outputs a signal indicating a result of the information processing to the D/A converter 64. For example, in a case where designation related to a light emission region is included in the command related to operation of the illumination device 100 and transmitted from the communication terminal device 500, the FPGA 63 performs information processing for operating the light adjustment part 700 so that light is emitted to the emission region corresponding to the designation.

The D/A converter 64 has a configuration that outputs, based on a digital signal that is a signal from the FPGA 63, an analog signal for operating a plurality of light adjustment panels 1 included in the light adjustment part 700. The configuration may be one circuit or may include a plurality of circuits.

The light source driver 65 performs, under control by the MCU 62, on/off control of the light source 800 included in the light source part 80 and light emission intensity control when the light source 800 is on. The light source driver 65 may be one circuit or may include a plurality of circuits.

Each light adjustment panel 1 included in the light adjustment part 700 will be described below with reference to FIGS. 11 to 15.

Figure 11:
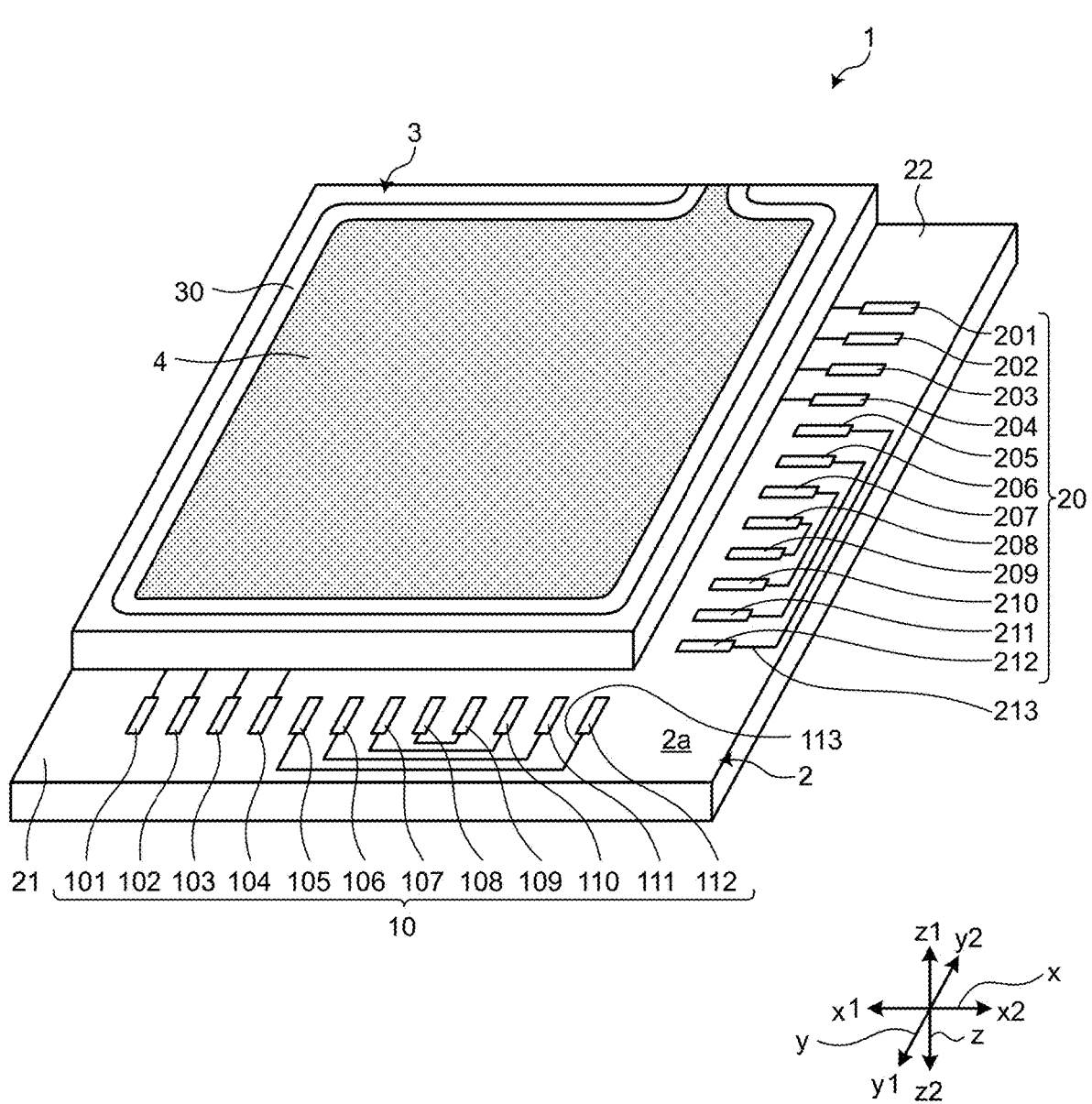
FIG. 11 is a perspective view of a light adjustment panel according to an embodiment.
Figure 12:
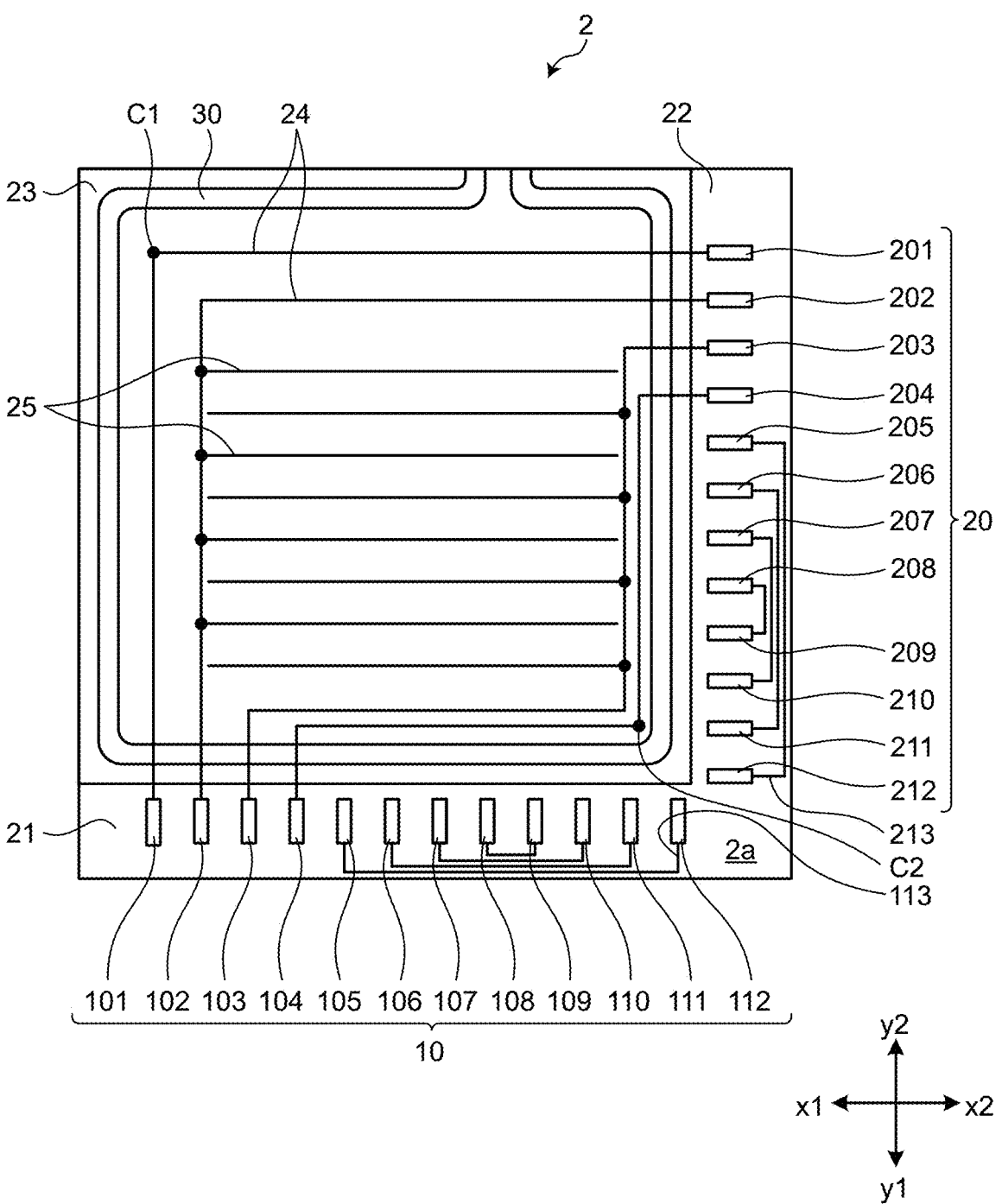
FIG. 12 is a plan view illustrating wiring of an array substrate of the light adjustment panel according to the embodiment when viewed from above.
Figure 13:
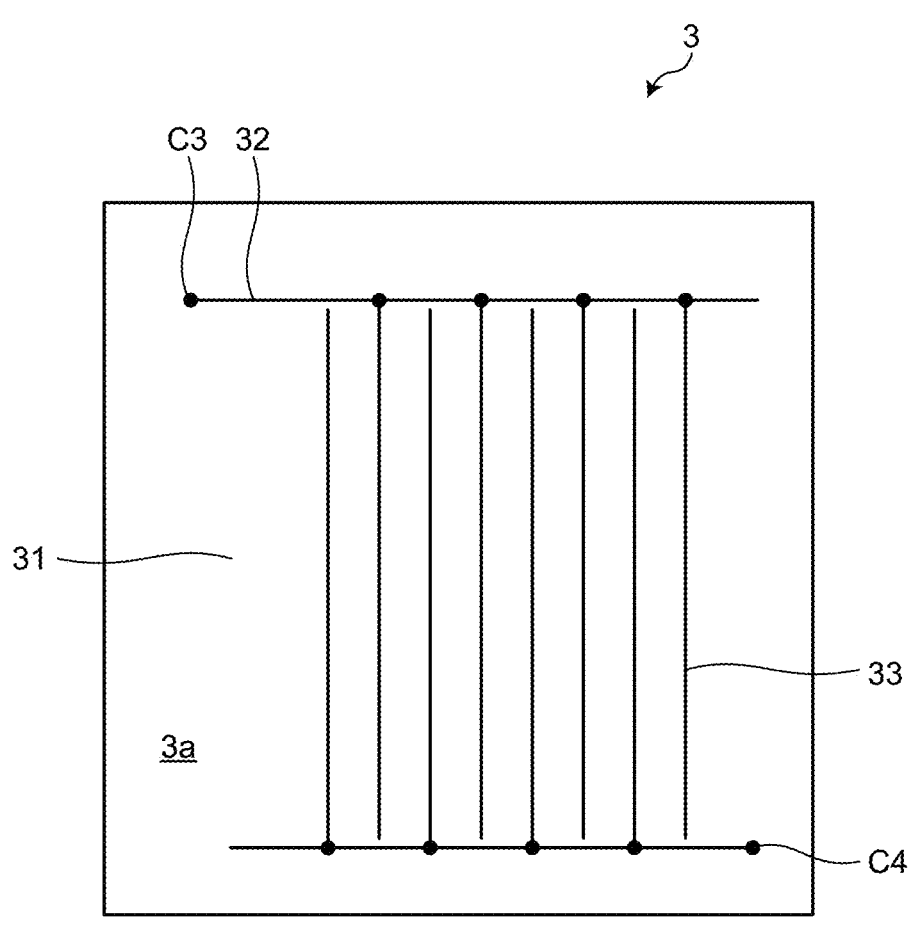
FIG. 13 is a plan view illustrating wiring of a counter substrate of the light adjustment panel according to the embodiment when viewed from above.
Figure 13:
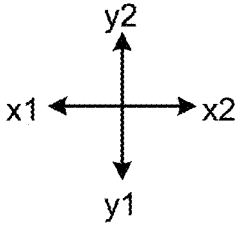
Figure 14:
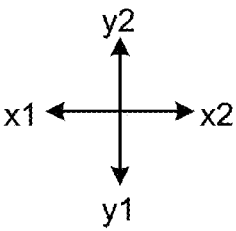
FIG. 14 is a plan view illustrating wiring of the light adjustment panel according to the embodiment when viewed from above.
Figure 15:
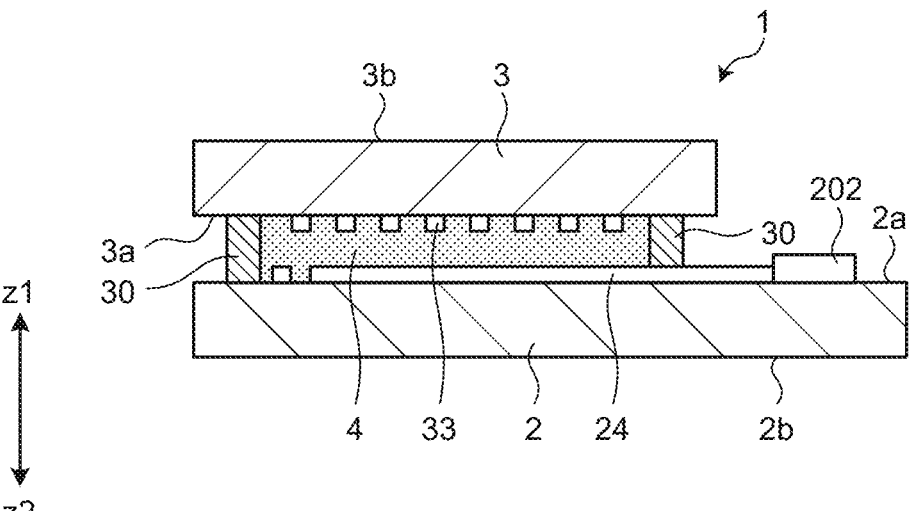
FIG. 15 is a sectional view along line IV-IV in FIG. 14.

FIG. 11 is a perspective view of a light adjustment panel according to an embodiment. FIG. 12 is a plan view illustrating wiring of an array substrate of the light adjustment panel according to the embodiment when viewed from above. FIG. 13 is a plan view illustrating wiring of a counter substrate of the light adjustment panel according to the embodiment when viewed from above. FIG. 14 is a plan view illustrating wiring of the light adjustment panel according to the embodiment when viewed from above. FIG. 15 is a sectional view along line IV-IV in FIG. 14. Note that, in an xyz coordinate system illustrated in FIGS. 11 to 14, a direction along an x1 direction and an x2 direction is referred to as an x direction. The x1 direction is opposite the x2 direction. A direction along a y1 direction and a y2 direction is referred to as a y direction. The y1 direction is opposite the y2 direction. A direction along a z1 direction and a z2 direction is referred to as a z direction. The z1 direction is opposite the z2 direction. The x direction is orthogonal to the y direction. A plane including the x direction and the y direction is orthogonal to the z direction.

As illustrated in FIG. 11, each light adjustment panel 1 includes an array substrate 2, a counter substrate 3, a liquid crystal layer 4, and a seal material 30.

As illustrated in FIGS. 11 and 14, the array substrate (first substrate) 2 is larger than the counter substrate (second substrate) 3. In other words, the area of the counter substrate (second substrate) 3 is smaller than the area of the array substrate (first substrate) 2. The array substrate 2 includes a transparent glass 23 (refer to FIG. 12). The counter substrate 3 includes a transparent glass 31 (refer to FIG. 13). In the embodiment, the array substrate 2 and the counter substrate 3 have square shapes in a plan view from above, but the shape of each substrate according to the present invention is not limited to a square shape. A first terminal group area 21 and a second terminal group area 22 are provided on a front surface 2a of the array substrate 2. The first terminal group area 21 is positioned at an end part of the front surface 2a of the array substrate 2 on the y1 side. The second terminal group area 22 is positioned at an end part of the front surface 2a of the array substrate 2 on the x2 side. The first terminal group area 21 and the second terminal group area 22 have L shapes when viewed from above. A first terminal group 10 is disposed in the first terminal group area 21, and a second terminal group 20 is disposed in the second terminal group area 22. Note that since the area of the counter substrate 3 is smaller than the area of the array substrate 2, the first terminal group 10 and the second terminal group 20 are exposed. The first terminal group 10 and the second terminal group 20 are also simply referred to as terminal portions.

As illustrated in FIGS. 11 and 14, the first terminal group 10 includes a first terminal 101, a second terminal 102, a third terminal 103, a fourth terminal 104, a first pad 105, a second pad 106, a third pad 107, a fourth pad 108, a fifth pad 109, a sixth pad 110, a seventh pad 111, and an eighth pad 112. The first terminal 101, the second terminal 102, the third terminal 103, the fourth terminal 104, the first pad 105, the second pad 106, the third pad 107, the fourth pad 108, the fifth pad 109, the sixth pad 110, the seventh pad 111, and the eighth pad 112 are sequentially arranged in a right-left direction from the x1 side toward the x2 side. The first pad 105 and the eighth pad 112 are electrically coupled to each other through a lead line 113. The second pad 106 and the seventh pad 111 are electrically coupled to each other through a lead line 113. The third pad 107 and the sixth pad 110 are electrically coupled to each other through a lead line 113. The fourth pad 108 and the fifth pad 109 are electrically coupled to each other through a lead line 113.

As illustrated in FIGS. 11 and 14, the second terminal group 20 includes a fifth terminal 201, a sixth terminal 202, a seventh terminal 203, an eighth terminal 204, a ninth pad 205, a tenth pad 206, an eleventh pad 207, a twelfth pad 208, a thirteenth pad 209, a fourteenth pad 210, a fifteenth pad 211, and a sixteenth pad 212. The fifth terminal 201, the sixth terminal 202, the seventh terminal 203, the eighth terminal 204, the ninth pad 205, the tenth pad 206, the eleventh pad 207, the twelfth pad 208, the thirteenth pad 209, the fourteenth pad 210, the fifteenth pad 211, and the sixteenth pad 212 are sequentially arranged in a front-back direction from the y2 side toward the y1 side. The ninth pad 205 and the sixteenth pad 212 are electrically coupled to each other through a lead line 213. The tenth pad 206 and the fifteenth pad 211 are electrically coupled to each other through a lead line 213. The eleventh pad 207 and the fourteenth pad 210 are electrically coupled to each other through a lead line 213. The twelfth pad 208 and the thirteenth pad 209 are electrically coupled to each other through a lead line 213.

Note that, as illustrated in FIG. 11, the counter substrate 3 is disposed on an upper side (z1 side) relative to the array substrate 2. The seal material 30 and the liquid crystal layer 4 are provided between the counter substrate 3 and the array substrate 2. The seal material 30 is provided in an annular shape along the outer periphery of the counter substrate 3 and the inside of the seal material 30 is filled with the liquid crystal layer 4. Note that a region in which the liquid crystal layer 4 is provided is an active region, the outside of the liquid crystal layer 4 is a frame region, and the first terminal group area 21 and the second terminal group area 22 are terminal regions.

Wiring of the array substrate 2 and the counter substrate 3 will be described below. Note that, as illustrated in FIG. 15, wiring is provided on a front surface among the front and back surfaces of each substrate. In other words, a surface on which wiring is provided is referred to as a front surface, and a surface opposite the front surface is referred to as a back surface. Specifically, as illustrated in FIG. 15, wiring is provided on the front surface 2a of the upper side among front surface 2a and a back surface 2b of the array substrate 2, and wiring is provided on a front surface 3a of the lower side among a front surface 3a and a back surface 3b of the counter substrate 3. In this manner, the front surface 2a of the array substrate 2 and the front surface 3a of the counter substrate 3 are disposed facing each other with the liquid crystal layer 4 interposed therebetween.

As illustrated in FIG. 12, wires 24 and first electrodes 25 are provided on the front surface 2a of the transparent glass 23 of the array substrate 2. Specifically, the first terminal 101 and the fifth terminal 201 are electrically coupled to each other through a wire 24. The second terminal 102 and the sixth terminal 202 are electrically coupled to each other through a wire 24. The third terminal 103 and the seventh terminal 203 are electrically coupled to each other through a wire 24. The fourth terminal 104 and the eighth terminal 204 are electrically coupled to each other through a wire 24. A plurality of first electrodes 25 are coupled to the wire 24 coupling the second terminal 102 and the sixth terminal 202. A plurality of first electrodes 25 are coupled to the wire 24 coupling the third terminal 103 and the seventh terminal 203. Note that couplers C1 and C2 are provided on the wires 24.

As illustrated in FIG. 13, wires 32 and second electrodes 33 are provided on the front surface 3a of the counter substrate 3. Specifically, the wires 32 are each provided on the y1 side and the y2 side. The wires 32 extend in the x direction. The second electrodes 33 are electrically coupled to the wires 32. The second electrodes 33 extend in the y direction. Note that couplers C3 and C4 are provided on the wires 32. In the example illustrated in FIGS. 12 to 14, the number of first electrodes 25 and the number of second electrodes 33 are eight, but these numbers are schematic and are not necessarily the actual numbers of first electrodes 25 and second electrodes 33. The number of first electrodes 25 and the number of second electrodes 33 only need to be equal to or larger than two and thus may be equal to or larger than nine.

As illustrated in FIGS. 14 and 15, the counter substrate 3 is disposed at an interval on the upper side relative to the array substrate 2. The liquid crystal layer 4 is filled between the array substrate 2 and the counter substrate 3. The coupler C1 of the array substrate 2 and the coupler C3 of the counter substrate 3 are electrically coupled to each other through a conductive pillar (not illustrated). The coupler C2 of the array substrate 2 and the coupler C4 of the counter substrate 3 are electrically coupled to each other through a conductive pillar (not illustrated).

As illustrated in FIG. 14, the first terminal 101, the second terminal 102, the third terminal 103, the fourth terminal 104, the first pad 105, the second pad 106, the third pad 107, and the fourth pad 108 can be electrically coupled to flexible printed circuits (FPC) 40 illustrated with dashed and double-dotted lines. For example, the light adjustment panels 1-1 and 1-4 are each coupled to the D/A converter 64 through the individually provided FPC 40.

Figure 16:
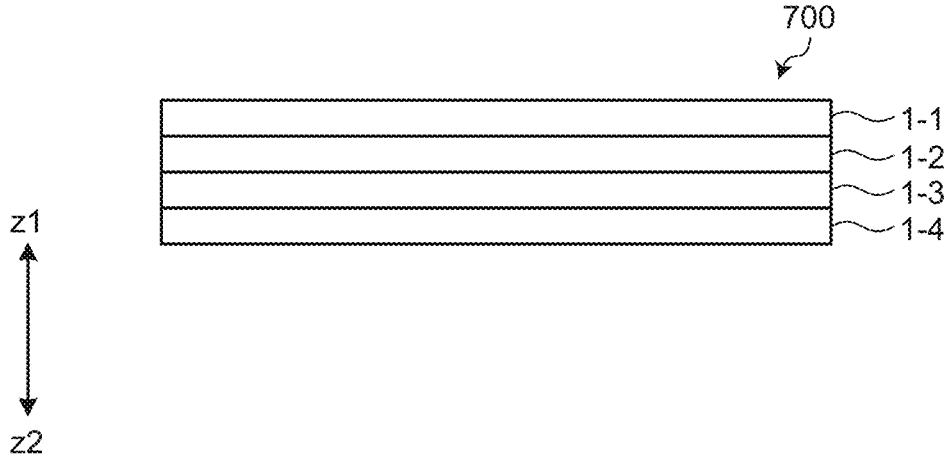
FIG. 16 is a schematic diagram illustrating the configuration of a light adjustment part.

FIG. 16 is a schematic diagram illustrating the configuration of the light adjustment part 700. As illustrated in FIG. 16, the light adjustment part 700 includes, for example, four light adjustment panels 1-1 and 1-4 stacked in the z direction. The four light adjustment panels 1-1 and 1-4 are the light adjustment panels 1-1 and 1-4 described above with reference to FIGS. 11 to 15. The four light adjustment panels 1-1 and 1-4 are stacked such that the liquid crystal layers 4 thereof overlap one another and disposition of the first electrodes 25 and the second electrodes 33 included in each liquid crystal layer overlaps those of the others at a plan viewpoint. A plan viewpoint is a front view of a plane including the x and y directions. A region in which the first electrodes 25 and the second electrodes 33 are disposed functions as a light distribution control region LDA illustrated in FIG. 17 and the like to be described later.

Figure 17:
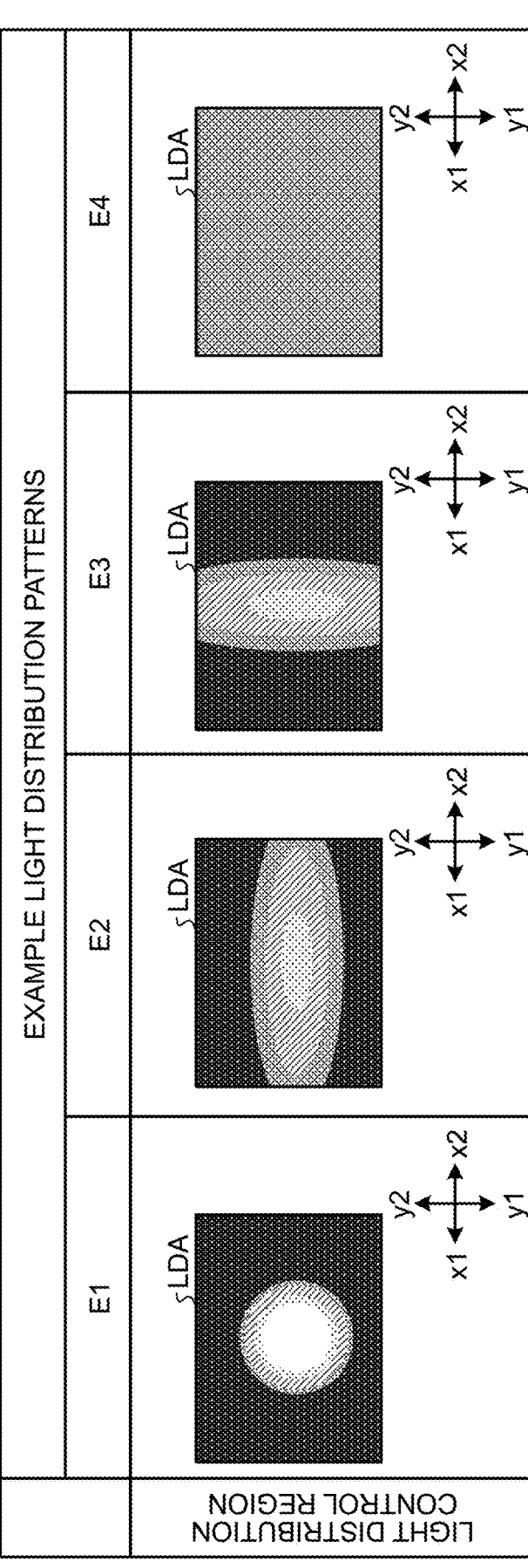
FIG. 17 is a schematic diagram illustrating an example of light distribution control by a light distribution control region.

FIG. 17 is a schematic diagram illustrating an example of light distribution control by the light distribution control region LDA. As described above, the light distribution control region LDA is a region in which the first electrodes 25 and the second electrodes 33 are disposed at a plan viewpoint. In other words, the light distribution control region LDA includes a plurality of electrodes extending in the x direction and arranged in the y direction and a plurality of electrodes extending in the y direction and arranged in the x direction. The electrodes extending in the x direction and arranged in the y direction are, for example, the first electrodes 25. The electrodes extending in the y direction and arranged in the x direction are, for example, the second electrodes 33.

Since the light adjustment part 700 includes the four light adjustment panels 1-1 and 1-4 overlapping one another in the z direction, the electrodes extending in the x direction and arranged in the y direction and the electrodes extending in the y direction and arranged in the x direction are quadruplicated in the z direction. The light distribution control region LDA can control the transmission region and transmission degree of light traveling from one surface side of the light adjustment part 700 toward the other surface side as in Examples E1, E2, E3, and E4 of "exemplary light distribution patterns" illustrated in FIG. 17 by controlling the potential of each of the electrodes extending in the x direction and arranged in the y direction and the electrodes extending in the y direction and arranged in the x direction of the four light adjustment panels 1-1 and 1-4 included in the light adjustment part 700.

Note that, in the following description, equal potential is applied to electrodes overlapping each other at a plan viewpoint. Example E1 in FIG. 17 is a schematic diagram illustrating the state of the light distribution control region LDA when viewed at a plan viewpoint from a side opposite a light source (for example, a light source 800) in a case where the potentials of the electrodes extending in the x direction and arranged in the y direction, and the electrodes extending in the y direction and arranged in the x direction are all 0 volt (V). In Example E1, light from the light source transmits through the light distribution control region LDA with almost no change.

Example E2 is a schematic diagram illustrating the state of the light distribution control region LDA when viewed at a plan viewpoint from a side opposite a light source (for example, a light source 800) in a case where the potentials of the electrodes extending in the x direction and arranged in the y direction are 0 volt (V), and the potentials of the electrodes extending in the y direction and arranged in the x direction exceed 0 volt (V). Example E2 illustrates the state of the light distribution control region LDA when controlling light distribution so that, when light spread in the x direction and light spread in the y direction are compared, light from the light source relatively largely spreads in the x direction but does not much spread in the y direction.

Example E3 is a schematic diagram illustrating the state of the light distribution control region LDA when viewed at a plan viewpoint from a side opposite a light source (for example, a light source 800) in a case where the potentials of the electrodes extending in the x direction and arranged in the y direction exceed 0 volt (V), and the potentials of the electrodes extending in the y direction and arranged in the x direction are 0 volt (V). Example E3 illustrates the state of the light distribution control region LDA when controlling light distribution so that, when light spread in the x direction and light spread in the y direction are compared, light from the light source relatively largely spreads in the y direction but does not much spread in the x direction.

Example E4 is a schematic diagram illustrating the state of the light distribution control region LDA when viewed at a plan viewpoint from a side opposite a light source (for example, a light source 800) in a case where the potentials of the electrodes extending in the x direction and arranged in the y direction, and the electrodes extending in the y direction and arranged in the x direction all exceed 0 volt (V). Example E4 illustrates the state of the light distribution control region LDA being entirely dark when viewed from the side opposite the light source with the light distribution control region LDA interposed therebetween because light from the light source is significantly interrupted by the light distribution control region LDA.

Note that the light distribution control region LDA only needs to include, at a plan viewpoint, two or more electrodes extending in the x direction and arranged in the y direction, and two or more electrodes extending in the y direction and arranged in the x direction. A first condition is such that one light distribution control region LDA includes m electrodes extending in the x direction and arranged in the y direction, and n electrodes extending in the y direction and arranged in the x direction. A second condition is such that the number of electrodes (for example, first electrodes 25) extending in the x direction and arranged in the y direction is m×p, and the number of electrodes extending in the y direction and arranged in the x direction (for example, second electrodes 33) is n×q in one of the light adjustment panels 1-1 and 1-4. With the first and second conditions as a premise, p light distribution control regions LDA in the x direction and q light distribution control regions LDA in the y direction can be set in a matrix of a row-column configuration in the light adjustment unit 700. The numbers m, n, p, and q are natural numbers of two or more. Alternatively, the entire active region (region in which the liquid crystal layer 4 is provided) included in one light adjustment panel at a plan viewpoint may be one light distribution control region LDA.

Examples E1, E2, E3, and E4 in FIG. 17 particularly illustrate difference in the shape of the light distribution region at a plan viewpoint by potential control. As described above with reference to FIGS. 14 and 15, the shape and size of the light transmission region can be more flexibly controlled because of the relation between potential provided to the first electrodes 25 and potential provided to the second electrodes 33. With this control, it is possible to change the shape and size of light to be emitted.

Another Embodiment

Figure 18:
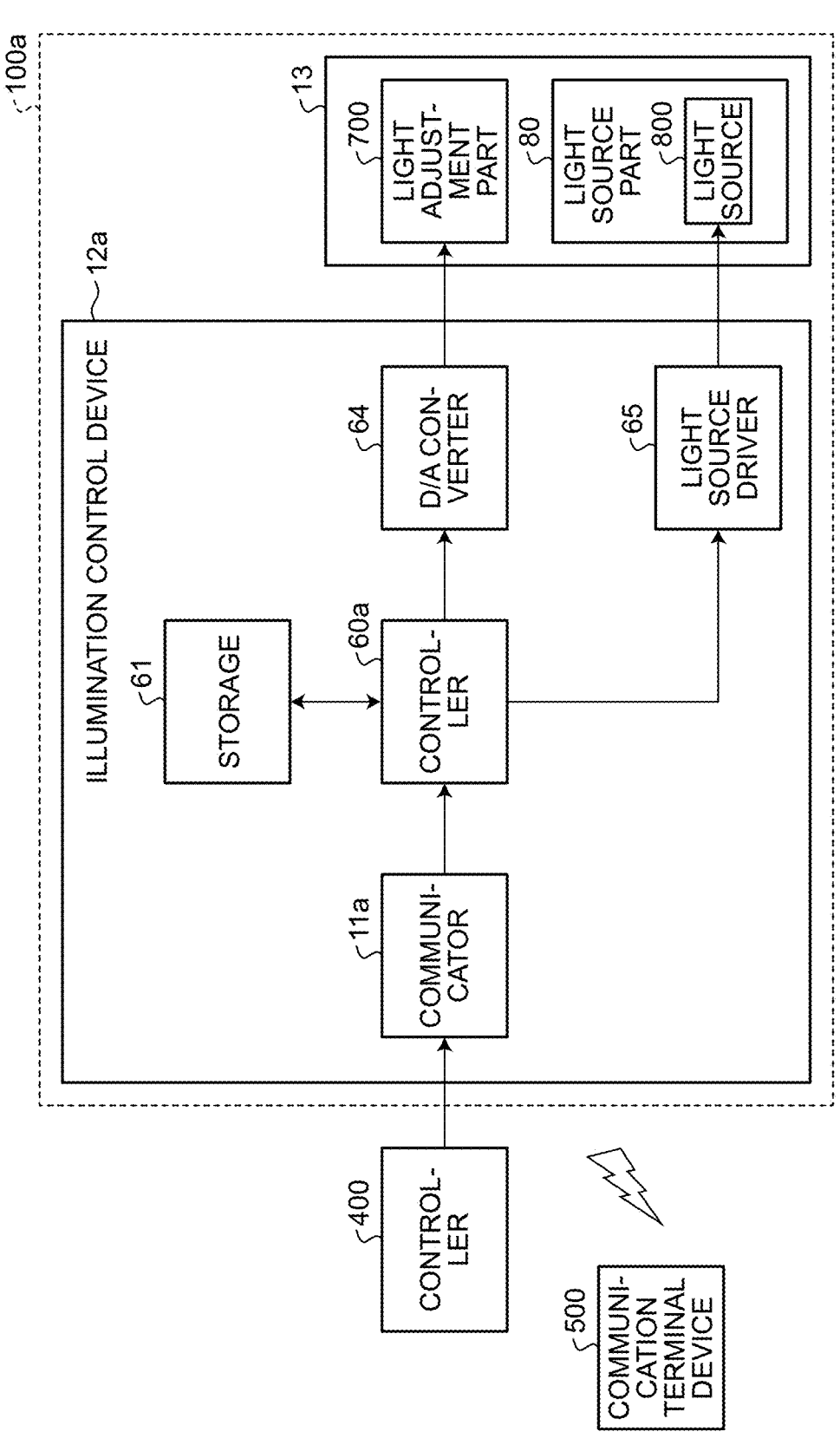
FIG. 18 is a diagram illustrating an exemplary configuration of another illumination device including the illumination control device according to the present embodiment.

The following describes an embodiment in which communication with a controller is performed through wired coupling. FIG. 18 is a diagram illustrating an exemplary configuration of another illumination device 100a including the illumination control device according to the present embodiment. In FIG. 18, the illumination device 100a includes an illumination control device 12a and the light emitter 13. The configuration and operation of the light emitter 13 are the same as described above.

In FIG. 18, the illumination control device 12 includes a communicator 11a, a controller 60a, the storage 61, the D/A converter 64, and the light source driver 65. A controller 400 outputs, for example, a DMX512 signal for controlling luminance and diffusion degree. The controller 400 outputs the DMX512 signal, for example, upon an operation of a slide switch (not illustrated) by a user.

The communicator 11a in the present example can perform wired communication with the controller 400 and can perform wireless communication with the communication terminal device 500. The communicator 11a can acquire setting information for controlling the light emitter 13 from the controller 400. The communicator 11a can acquire, for example, the DMX512 signal from the controller 400. The DMX512 signal is a signal including the setting information for controlling the light emitter 13. The DMX512 signal acquired by the communicator 11*a* is transferred to the controller 60*a*.

The controller 60*a* controls the light emitter 13 based on the setting information included in the DMX512 signal received by the communicator 11*a*. The setting information includes luminance data for controlling the luminance of the light source 800 and control data for controlling the light adjustment part 700. Note that, in a case where the luminance of the light source 800 is fixed, the setting information does not include the luminance data but includes the control data for controlling the light adjustment part 700.

The illumination device 100*a* can switch from a state of acquiring the setting information from the controller 400 to a state of acquiring the setting information from the communication terminal device 500. The switching is performed upon an interrupt input from the communication terminal device 500. The setting information in the state before the switching is written to the storage 61, and after the switching, the setting information is read from the storage 61 and the light emitter 13 is controlled based on the read setting information.

Figure 19:
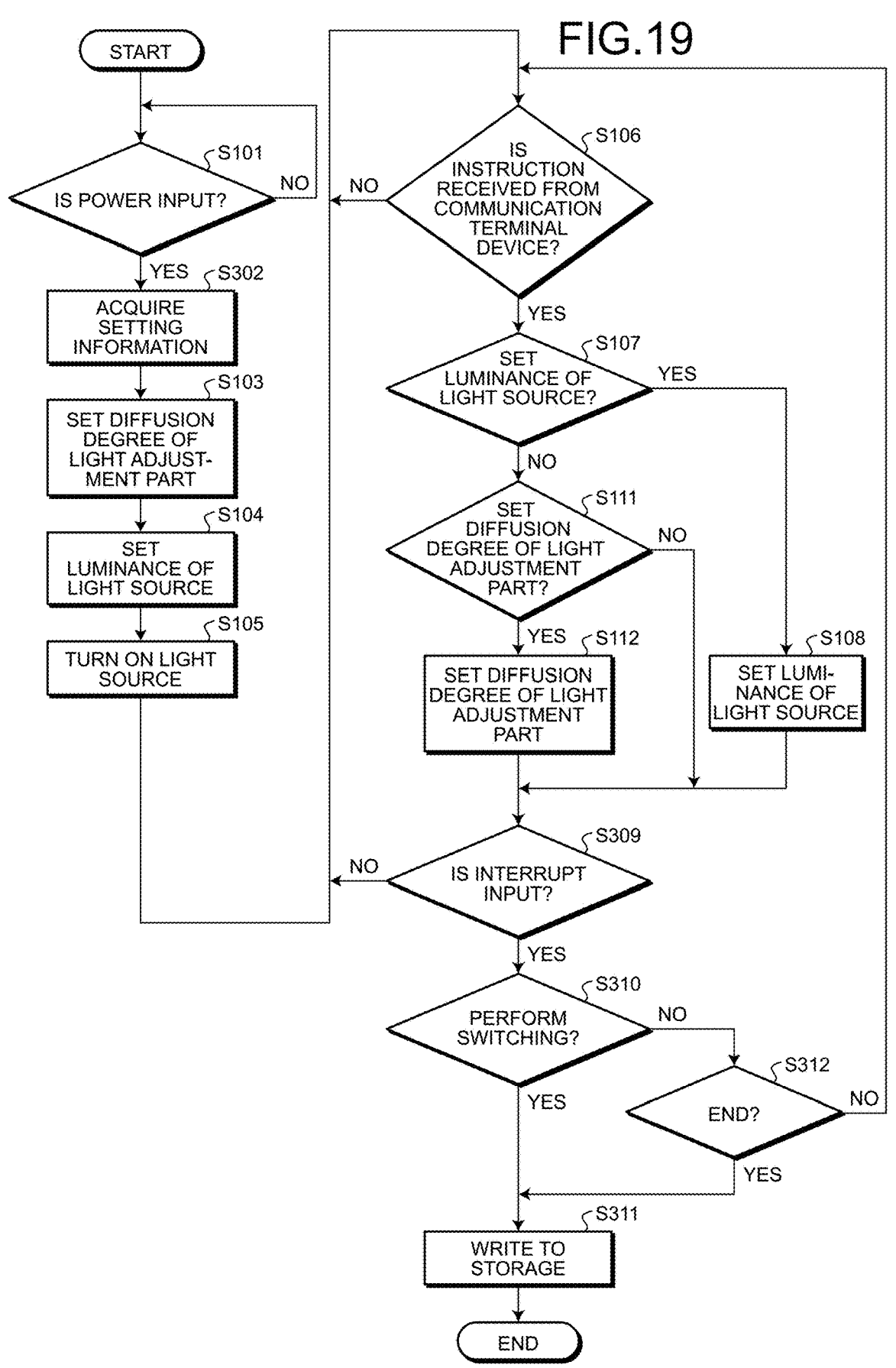
FIG. 19 is a flowchart illustrating exemplary processing by the controller in FIG. 18.

FIG. 19 is a flowchart illustrating exemplary processing by the controller 60*a* in FIG. 18. FIG. 19 is a flowchart illustrating a processing example when power is input to the illumination control device 12*a*. In FIG. 19, first, the controller 60*a* determines whether power is input to the illumination control device 12*a* (step S101). Processing by the controller 60*a* waits until power is input (No at step S101).

When having determined that power is input to the illumination control device 12 (Yes at step S101), the controller 60*a* acquires the setting information, in other words, the control data and the luminance data from the controller 400 through the communicator 11*a* (step S302). Processing at steps S103 to S108 after the control data and the luminance data are acquired and processing at steps S111 and S112 are the same as the corresponding processing described above with reference to FIG. 3.

After having set the luminance of the light source 800 (step S108), the controller 60*a* checks to the communicator 11*a* whether an interrupt is input from another communication terminal device 500 other than the controller 400 (step S309). When having determined that the interrupt is input at step S309 (Yes at step S309), the controller 60*a* determines whether to perform switching to a state of controlling the light emitter 13 based on the setting information input from the communication terminal device 500 to the communicator 11*a* (step S310). When having determined that the switching is to be performed at step S310 (Yes at step S310), the controller 60*a* writes the setting information as of then to the storage 61 (step S311) and ends processing. In this case, the above-described interrupt corresponds to a request for writing the setting information.

When having determined that no interrupt is input at step S309 (No at step S309), the controller 60*a* returns to step S106 and continues processing.

When having determined that the switching is not to be performed at step S310 (No at step S310), the controller 60*a* determines whether to end processing (step S312). When having determined to end processing at step S312 (Yes at step S312), the controller 60*a* writes the setting information as of then to the storage 61 (step S311) and ends processing. In this case, the above-described interrupt corresponds to a request for writing the setting information. Thereafter, switching is made to the state of controlling the light emitter 13 based on the setting information input from the communication terminal device 500 to the communicator 11*a*. Note that, after the switching, processing proceeds to any of the processing described above with reference to FIG. 3, the processing described above with reference to FIG. 5, the processing described above with reference to FIG. 7, and the processing described above with reference to FIG. 8.

When having determined not to end processing at step S312 (No at step S312), the controller 60*a* returns to step S106 and continues processing.

As described above with reference to FIGS. 17 and 18, at switching to the state of controlling the light emitter 13 based on the setting information input to the communicator 11*a* from the communication terminal device 500 as a second communication terminal device other than the controller 400 as a first communication terminal device, the setting information in the state before the switching is written to the storage 61. Then, after the switching, the setting information is read from the storage 61 as described above with reference to FIG. 3, 5, 7, or 8. Thereafter, the illumination control device 12*a* controls the light emitter 13 based on the read setting information.

According to the present disclosure, it is possible to achieve the same use state as a previous use state in an illumination device when power is turned on.

What is claimed is:

1. An illumination control device comprising:
    a storage that is non-transitory and stores setting information for controlling a light emitter configured to emit light; and
    a controller that writes the setting information as of then to the storage when a request for writing the setting information is input and reads the setting information from the storage when a request for reading the setting information is input, wherein
    the light emitter is controlled based on the setting information read by the controller,
    the light emitter includes a light source and a light adjustment part configured to adjust light from the light source, and
    the setting information includes luminance data for controlling luminance of the light source and control data for controlling the light adjustment part.

2. The illumination control device according to claim 1, wherein the controller writes the setting information as of then to the storage when the illumination control device is powered off.

3. The illumination control device according to claim 1, wherein the controller writes the setting information as of then to the storage each time the setting information is changed.

4. The illumination control device according to claim 1, wherein after the light adjustment part is controlled based on the control data, the luminance of the light source is controlled based on the luminance data.

5. The illumination control device according to claim 1, wherein after the luminance of the light source is controlled based on the luminance data, the light adjustment part is controlled based on the control data.

6. The illumination control device according to claim 1, wherein
    the light adjustment part includes a light adjustment panel for p-wave polarization and a light adjustment panel for s-wave polarization,
    the light adjustment panel for p-wave polarization and the light adjustment panel for s-wave polarization are stacked, signals based on the control data are provided to the light adjustment panel for p-wave polarization and the light adjustment panel for s-wave polarization, and light from the light source is emitted through the light adjustment panel for p-wave polarization and the light adjustment panel for s-wave polarization.

7. An illumination control device comprising:

a communicator configured to perform communication with a communication terminal device;

a controller configured to control, based on setting information input from a first communication terminal device to the communicator, a light emitter configured to emit light; and a storage that is non-transitory and stores the setting information, wherein at switching to a state in which the light emitter is controlled based on setting information input from a second communication terminal device other than the first communication terminal device to the communicator, the controller writes the setting information in a state before the switching to the storage, reads the setting information from the storage after the switching, and controls the light emitter based on the read setting information.

8. The illumination control device according to claim 7, wherein the communicator performs communication with the first communication terminal device through wired coupling and performs communication with the second communication terminal device through wireless communication.

\* \* \* \* \*